United States Patent [19]
Barber et al.

[11] Patent Number: 5,251,251
[45] Date of Patent: Oct. 5, 1993

[54] TELECOMMUNICATIONS NETWORK-BASED GREETING CARD METHOD AND SYSTEM

[75] Inventors: Kathryn Barber, Upper Montclair; Brad Wendkos, Hackensack, both of N.J.

[73] Assignee: Greetings By Phoneworks, Hackensack, N.J.

[21] Appl. No.: 755,958

[22] Filed: Sep. 6, 1991

[51] Int. Cl.5 .......................... H04M 1/64; H04M 1/00
[52] U.S. Cl. .......................... 379/67; 379/88; 379/89; 379/71; 379/357
[58] Field of Search .................. 379/67, 88, 89, 71, 379/72, 357

[56] References Cited

U.S. PATENT DOCUMENTS

| | | | |
|---|---|---|---|
| 3,944,724 | 3/1976 | Kilby et al. | 375/25 |
| 4,602,129 | 7/1986 | Matthews et al. | 379/88 |
| 4,796,180 | 1/1989 | Riley | 379/88 |

*Primary Examiner*—James L. Dwyer
*Assistant Examiner*—Fan Tsang
*Attorney, Agent, or Firm*—Lowe, Price, LeBlanc & Becker

[57] ABSTRACT

A subscriber's personalized voice message to be played out to a recipient is recorded by a central facility over a telecommunications network. The subscriber selects a prerecorded message from a library of messages, and is assigned an access code associated with both the personalized and prerecorded messages. A greeting card bearing the access code is mailed by the subscriber to the recipient who will call the facility, enter the access code and hear the personalized and subscriber-selected messages played out in succession. The library of messages preferably contains prerecorded voice messages of celebrities or professional celebrity impersonators.

15 Claims, 6 Drawing Sheets

INSTRUCTIONS TO SEND

Call 1-800-447-3836 from a touch-tone phone.

Then, when asked to do so:

1. Punch in this code

N⁰ 337145

2. Record your 20-second personal message (this will be heard before your CALLING CARD selection).

3. Punch in the three-digit code of the CALLING CARD selection you would like to send.

Then, tear off this tab, write a personal message in the outlined area, address, stamp and mail your CALLING CARD.

Need to recorder?
Call 1-800-_____ to take advantage of our special reorder offer.

GREETINGS

You have a special personalized message waiting for you. — F2

To hear your CALLING CARD:

1. Call 1-800-_____ from a touch-tone phone.

2. When asked to do so, punch in this code:

N⁰ 337145 — F1

T0 ——

F3

TO:

To order your own CALLING CARDS by phoneworks Kit, call our customer service department at 1-800-_____.

PLACE STAMP HERE

Figure 3(a)

TELECOMMUNICATIONS NETWORK-BASED GREETING CARD METHOD AND SYSTEM

TECHNICAL FIELD

The invention relates generally to storage of voice messages at a central facility to be played out over a telecommunication network to designated recipients. The invention relates more particularly to a voice message method and system implementing a "greeting card" bearing an access code corresponding to associated personalized and subscriber-selected prerecorded messages to be played out successively to a designated recipient.

BACKGROUND ART

Voice message storage and retrieval systems, such as "voice mail", enable a caller to store or retrieve a voice message handled by a central facility over telephone voice/data lines. In the usual voice storage and retrieval system, a synthesized voice first is generated from a voice memory and sent to a subscriber to provide certain instructional information. Transmission of the synthesized voice is followed by transmission of a personalized recorded message stored elsewhere, such as in a hard disk. The voice message thereafter is retrieved from the hard disk and supplied to a buffer memory for subsequent transmission to the requesting subscriber. One example of a voice storage/retrieval system known in the prior art is described in Fukanaga U.S. Pat. No. 4,985,914.

In voice mail systems and the like, the message recipient ordinarily will retrieve from a voice mail storage facility a generalized prerecorded instructional message followed by a personalized message stored in his or her "mail box". The generalized message has no particular relationship to the personalized message, nor is the generalized message selected by the subscriber. The recipient will access the content of the mail box by "dialing in", ordinarily at a DTMF telephone keypad, the access code of the recipient's personal mail box or a mail box of his or her organization to which the recipient has the right of access.

The present invention is directed to implementation of a voice message storage/retrieval system that will be accessible to a designated recipient preferably on a one-time basis. A preferred application of the invention is in the context of a voice mail "greeting card" where a subscriber stores both a personalized message and a selected prerecorded message at a voice message storage facility over a telecommunication network. The access code of the two messages is printed on a record medium, resembling a greeting card, to be mailed to a designated recipient. The recipient calls the voice message storage facility, and enters the access code, read from the card. The facility plays out the personalized and subscriber-selected prerecorded messages to the recipient.

The prerecorded message is selected by the subscriber from a library of prerecorded messages that preferably are voice messages from celebrities or professional celebrity impersonators. The combination of personalized and celebrity voice messages commonly will commemorate an event such as a birthday or anniversary, in the fashion of a greeting card.

DISCLOSURE OF THE INVENTION

More specifically, in accordance with a first aspect of the invention, a voice/message storage and retrieval system comprises a record medium to be provided to the recipient and bearing an access code. At a central message handling facility, a personalized voice message received from a subscriber over the telecommunications network is stored in a memory. A library of subscriber-selectable prerecorded messages in voices other than the voice of the subscriber is stored in a prerecorded message data base. Each personalized voice message, together with a subscriber-selected prerecorded message, is associated with the access code provided on the record medium. When the access code is received from the recipient, the personalized and subscriber-selected messages are played out successively to the recipient.

The record medium preferably is made of paper or cardboard, and is in the form of a "greeting card" having a field bearing the access code. The card preferably includes another field bearing library message selections and associated library selection codes, and a third field within which the recipient's address will be written by the subscriber. Another field may bear general instructional text.

After messages are played out, the personalized message automatically is erased from the memory in accordance with one aspect of the invention. As other aspects, a greeting message instructing on how to record a personalized message and how to select a prerecorded message from the library is played to the subscriber. The subscriber is given the option to preview prerecorded messages by entering message selection codes. Following a vocal prompt, corresponding personalized and selected prerecorded messages are programmed by the subscriber by entering the access code printed on one of the "greeting cards". Following another prompt the subscriber speaks the personalized voice message, and then following a further prompt he or she enters the selection code of a desired prerecorded message. The greeting card, bearing the access code, then is addressed and mailed by the subscriber to the designated recipient.

An object of this invention, therefore, is to adapt a voice message storage facility to an unlimited range of designated recipients. A more particular object is to implement a voice message storage and retrieval facility within the context of a greeting card.

Still other objects and advantages of the present invention will become readily apparent to those skilled in this art from the following detailed description, wherein only the preferred embodiment of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF DRAWINGS

FIG. 3(a) is a view of one side of a "greeting card" of this invention, showing the access code and address fields and another field containing general informational text.

BEST MODE FOR CARRYING OUT THE INVENTION

Figure 1:
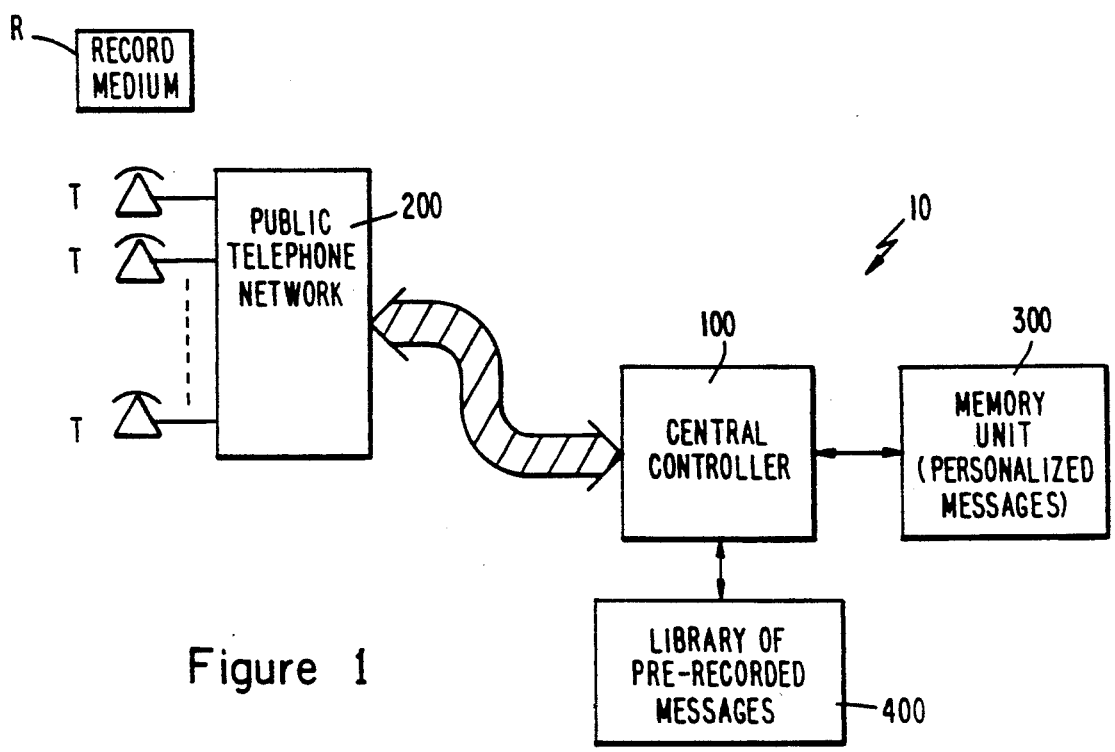
FIG. 1 is a simplified block diagram depicting a voice message handling facility and telecommunications network implementing voice message storage/retrieval in accordance with the principles of the invention.

Referring to FIG. 1, hardware for implementing the present invention at a central facility 10 comprises a central controller 100, a memory unit 300 for storing personalized messages and an interface to a public telephone network 200 for communicating with data and voice data entry terminals, such as telephones T, used by individuals to record and retrieve messages from the facility. Individuals accessing the facility ordinarily comprise subscribers who will record voice messages at the facility and recipients who will retrieve them. Although telephones are utilized in the preferred embodiment as voice/data entry terminals, other forms of terminals, such as personal computers or facsimile apparatus, outfitted to carry out both voice and data communications, are acceptable alternatives.

Public telephone network 200 carries out circuit path switching between the voice storage and retrieval facility 10 and registered users in a conventional matter. Further details of conventional voice message on-line processing, such as are exemplified by U.S. Pat. No. 4,985,914, are omitted for brevity. Whereas communication between central controller 100 and subscriber/recipient terminals T is depicted as being carried out by a telecommunication network in the form of public telephone switching, communication alternatively can be carried out by other media, such as radio or microwaves including satellite transmission.

Central computer 100 is connected or has access to a data base 400 containing a library of messages preferably in the form of prerecorded voice messages by celebrities or celebrity impersonators. The data base 400 may be incorporated in a separate data storage unit, as shown, or integrated with memory unit 300. Either of or both units 300 and 400 may be supplied as an element or elements of the central controller 100. Also included within the system of FIG. 1 is a unique access code-bearing record medium R described later.

Figure 2:
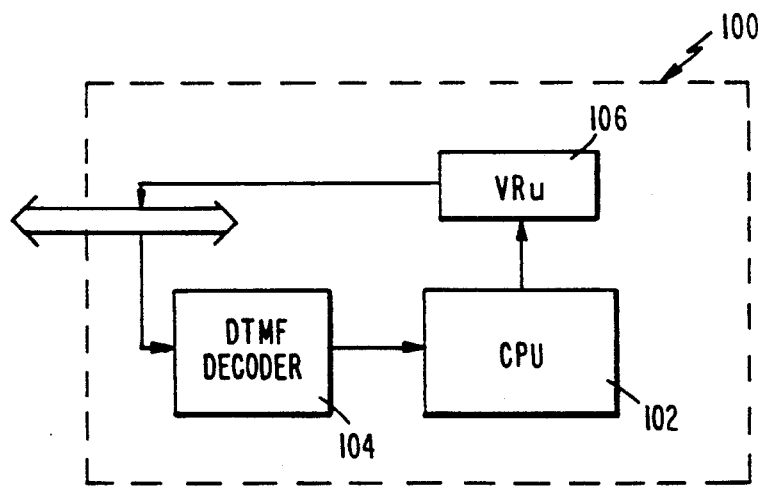
FIG. 2 is a more detailed block diagram of the central controller incorporated in FIG. 1.

Referring to FIG. 2, central controller 100 includes a central processor unit (CPU) 102 that receives subscriber/recipient-entered data through a decoder 104 which, in the preferred embodiment, is a dual tone multi-frequency (DTMF) decoder to accommodate conventional Touch-Tone (TM) telephones. The CPU 102 in turn controls a commercially available voice response unit (VRU) 106 to transmit synthesized voice messages from data stored in memory unit 300 and data base storage unit 400. Alternatively, voice messages may be supplied to the telephone of a subscriber/recipient by magnetically stored data, such as from a hard disk or in the form of audio messages prerecorded on an addressable magnetic tape. CPU 102 is controlled by programming depicted in FIGS. 4-7, described later.

An important aspect of the invention is the record medium R, as shown in FIG. 1, which carries an access code corresponding to a personalized message stored in memory unit 300 and a subscriber-selected prerecorded message stored in data base storage unit 400. The subscriber instructs the facility 10 to store his or her personalized message together with a subscriber-selected prerecorded message found in data base storage unit 400. The subscriber initially obtains from the facility 10 a kit comprising a number of the record media R resembling "greeting cards", each bearing, among other information, a unique access code. To store messages to be retrieved by a designated recipient, the subscriber calls the facility, enters his/her access code, and following validation, sends a personalized voice message followed by a selection code that identifies one of the prerecorded messages stored in the unit 400.

The subscriber then mails the card bearing the access code to the recipient, who calls the facility, enters the access code, and following validation, hears the subscriber's personalized message followed by the subscriber-selected prerecorded message.

For example, the personalized message may be a message by the subscriber referring to the recipient by name, voicing a greeting and then introducing a celebrity who will be said to convey another greeting to the recipient. The celebrity message, having been preselected by the subscriber from the library of prerecorded messages, will form a humorous supplement to the personalized message.

Referring to FIG. 3(a) the medium R preferably is in the form of a greeting card including a region for a postage stamp so that the card can be mailed directly to the recipient. One side of the card bears a first field F1 containing the unique access code. Another field F2, above the field F1, contains generalized information including the telephone number of the voice message storage and retrieval facility and some instructional text. Beneath the access code field F1 is a third field F3 into which the subscriber will write the address of the recipient. The location of the various fields, of course, may be varied.

To one side of the fields F1–F3 is a tear-off portion TO bearing the access code which comprises the same series of alphanumeric characters as the access code in field F1. This portion, which includes instructions to the subscriber, is torn from the remainder of the card and retained as a receipt before the card is mailed.

Figure 3B:
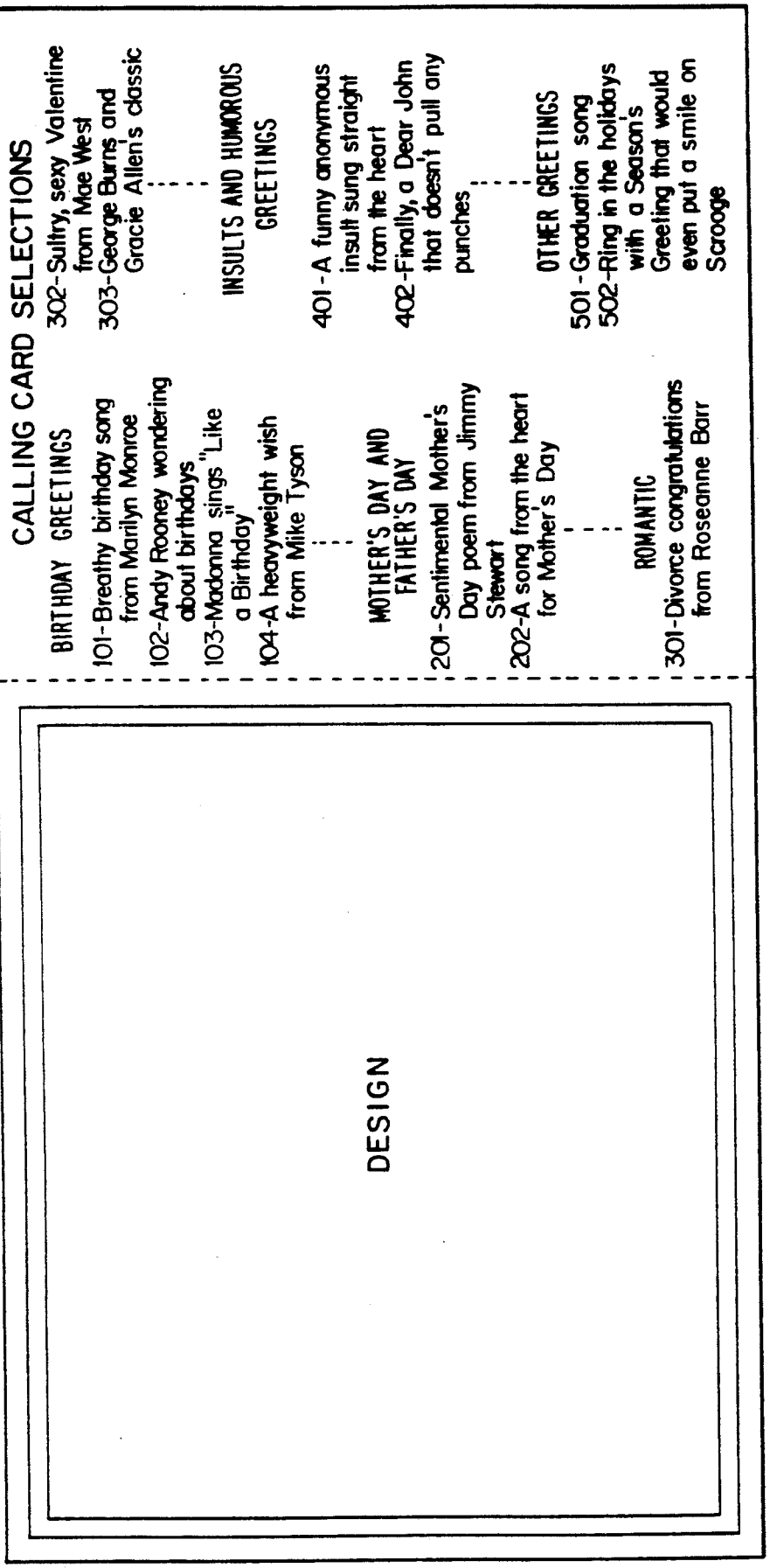
FIG. 3(b) is a view of the opposite side of the greeting card showing the prerecorded message code field.

On the opposite side of the card, shown in FIG. 3(b), is a portion carrying an ornamental design. The tear-off portion TO on this side of the card comprises another field F4 bearing the library of prerecorded messages, together with associated message selection codes available to the subscriber.

Figure 4:
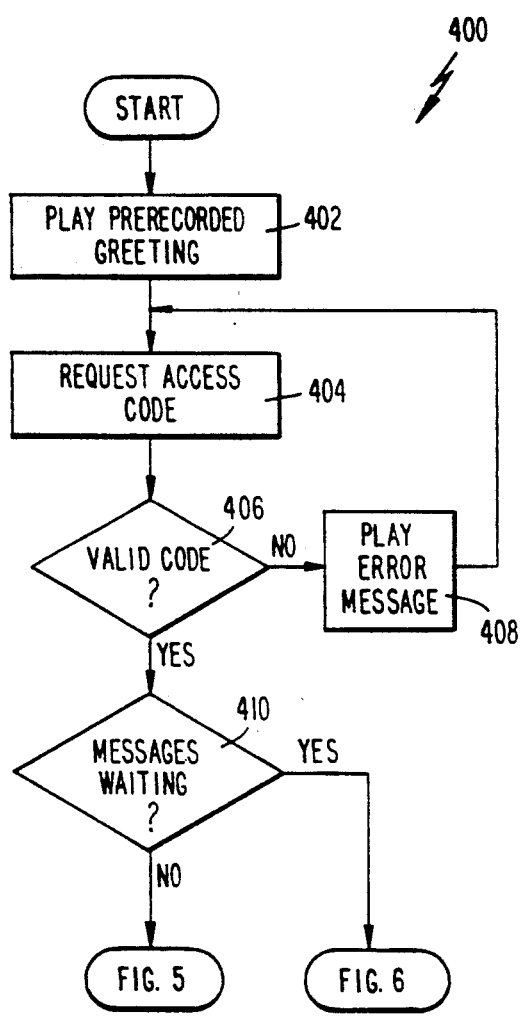
FIG. 4 is a flowchart of programming for initially responding to incoming calls in accordance with the invention.

Referring now to FIG. 4, programming for operating CPU 102 for controlling storage and retrieval of personalized and subscriber-selected prerecorded voice messages, in accordance with this invention, comprises a first step 402 for playing a prerecorded greeting or "welcome message" to the caller, who at this time may either be a subscriber or a recipient. The greeting will identify the facility and will instruct the caller to enter the access code found on card R (step 404). Step 406 interrogates memory unit 300 to determine whether the code is valid.

There are three possibilities. If the code has not been assigned, that is, has not been printed on a card for distribution to a subscriber, step 408 plays an error message to the caller, and requests him or her to try again. If a predefined number of access codes entered by the caller are found to be invalid, the facility will sign off. However, assuming that the access code is found to be valid by step 406, the facility determines in step 410 whether a memory region defined by the access code entered by the caller is awaiting messages from a subscriber or already contains messages to be played to a recipient.

Figure 5:
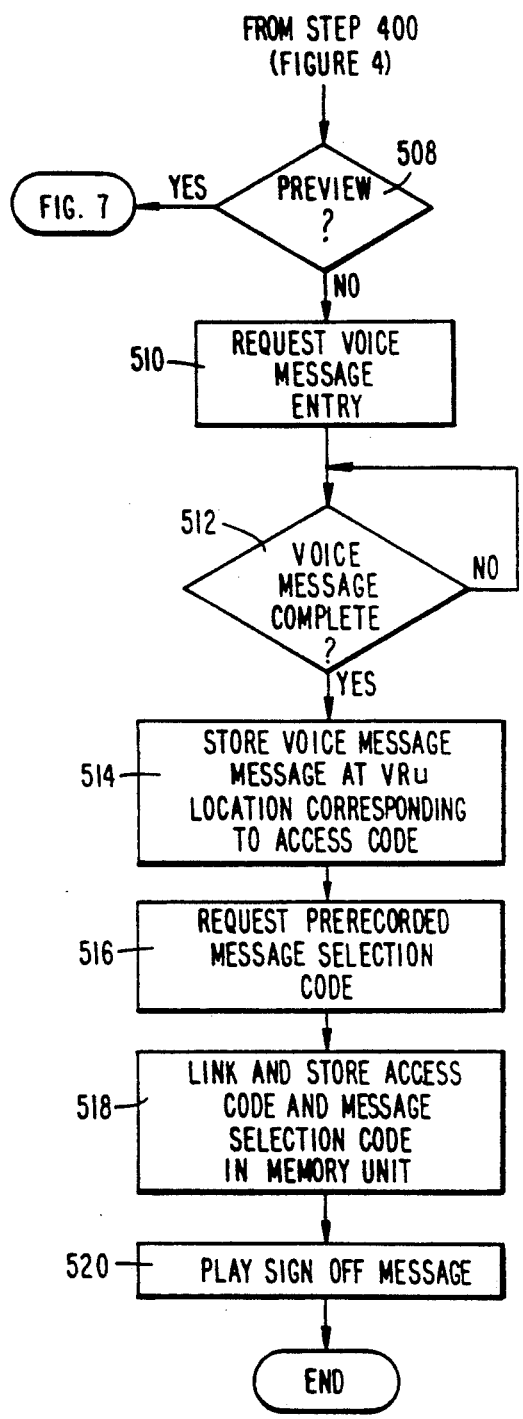
FIG. 5 is a flowchart of a programming routine for storing personalized and subscriber-selected prerecorded voice messages associated with an access code at the voice message handling facility.
Figure 6:
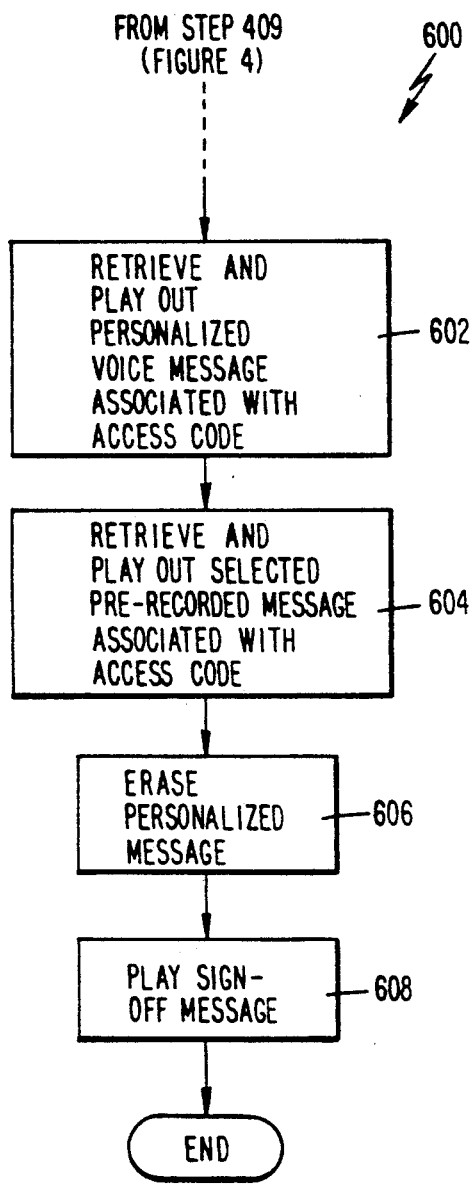
FIG. 6 is a flowchart of a routine for retrieving personalized and subscriber-selected voice messages associated with an access code keypad-entered by a recipient.

If the memory region defined by the access code contains no messages, the caller is presumed to be a subscriber, and execution of the program 400 will jump to the program routine of FIG. 5 for recording personalized and subscriber selected prerecorded messages selected by the subscriber. If the memory region defined by the code already contains messages, the caller is presumed to be a recipient and the messages are played out by the program routine of FIG. 6.

Assuming initially that the memory region defined by the access code is found to be unused, the subscriber will be given a "preview" option (step 508) enabling him or her to preview prerecorded message selections. If the option is selected, the program jumps to the routine of FIG. 7, described later. If the option is not selected, the subscriber is requested to provide his/her personalized voice message. A predefined period of time, such as twenty seconds preferably is provided for receiving the message (step 510). When the message is determined to have been completed, either by timing the duration of silence following the end of the message or upon expiration of the time limit (step 512), the personalized voice message is stored in memory, which may comprise memory unit 300 or memory incorporated with VRU 106.

The subscriber next is requested to keypad enter his/her prerecorded message selection code (step 516). from the list provided in field F4 of the card R.

Figure 8:
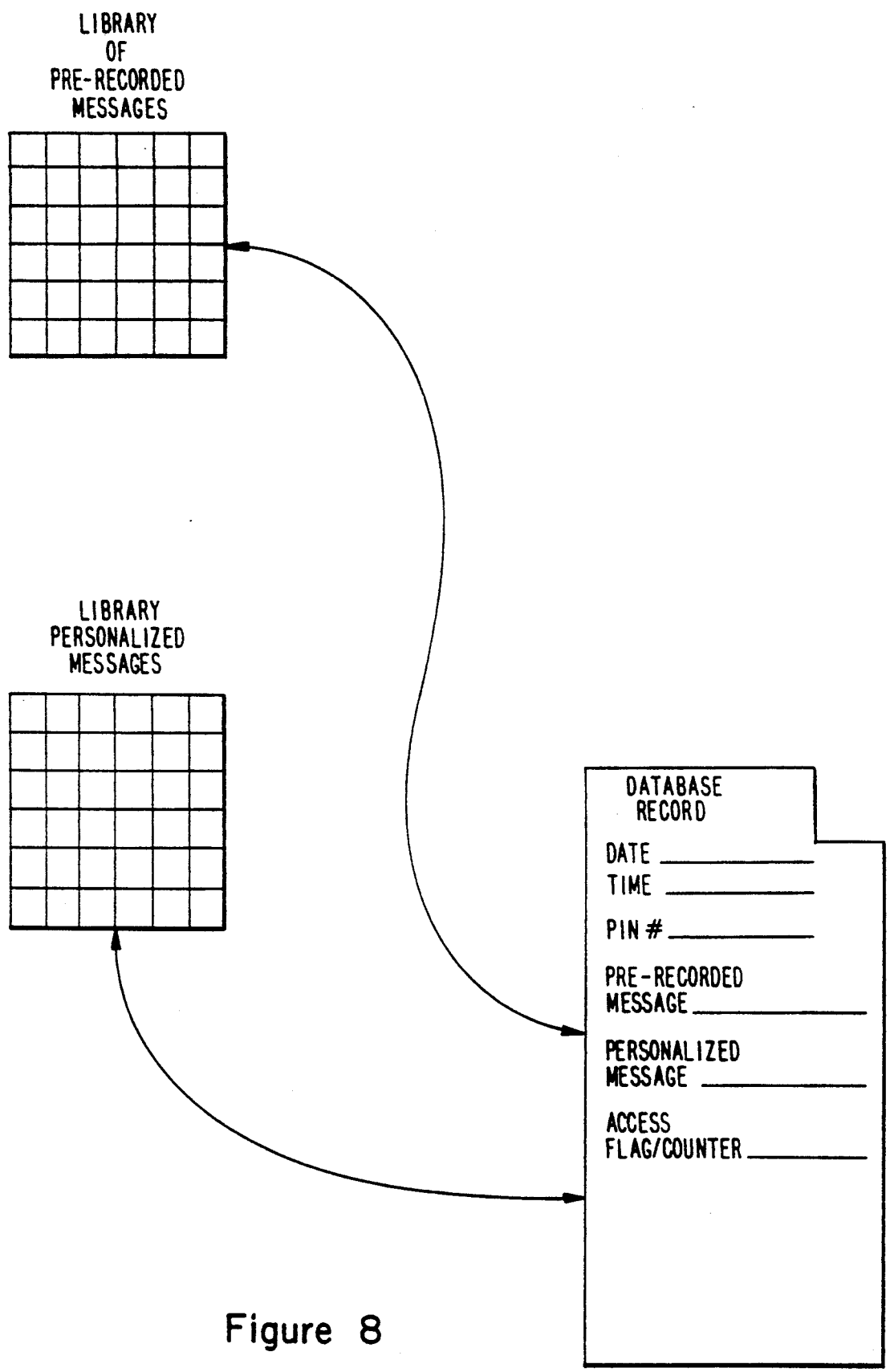
FIG. 8; is a diagram showing symbolically how personalized and subscriber-selected prerecorded messages are linked together and retrieved in response to access code.

The facility next links together the access code and message selection code, and stores the two codes in memory unit 300 (step 518). FIG. 8 depicts in symbolic form code linking for the preferred embodiment; any suitable algorithm for linking codes or addresses may be implemented. In the preferred embodiment, a data base record for each access code established as shown in FIG. 8, contains the date and time the record is established, as well as addresses of the personalized and prerecorded messages associated with the access code. The record further contains a flag which is set when messages have been recorded, and reset when the messages are accessed.

A sign-off message then is played to the subscriber (step 520), and the facility goes off-line.

Assume now that the access code, queried in step 406, defines a memory region that already contains messages (i.e., flag bit = 1). Step 602 in FIG. 6 uses the access code to retrieve and play out the associated personalized voice message from memory unit 300. Under control by CPU 102, the personalized message in the form of digital data is transferred to VRU 106 where the data are transformed to a corresponding voice message.

Step 604 implements the prerecorded message selection code (see FIG. 8), linked to the access code, to fetch the corresponding message data from the library of prerecorded messages stored in unit 400, to be supplied to the VRU in the same fashion. As a result, the personalized message, followed by the subscriber-selected prerecorded message, is sent to the recipient, and the flag bit is reset. The order of these messages is optional, the subscriber-selected message could be sent first.

After the messages are sent to the recipient, step 606 automatically erases the personalized message, freeing the access code and its corresponding memory region for use by another subscriber. The access code now becomes available to be printed on another card R and available for use again. A sign-off message is played out to the recipient, and the facility signs off (step 608).

Figure 7:
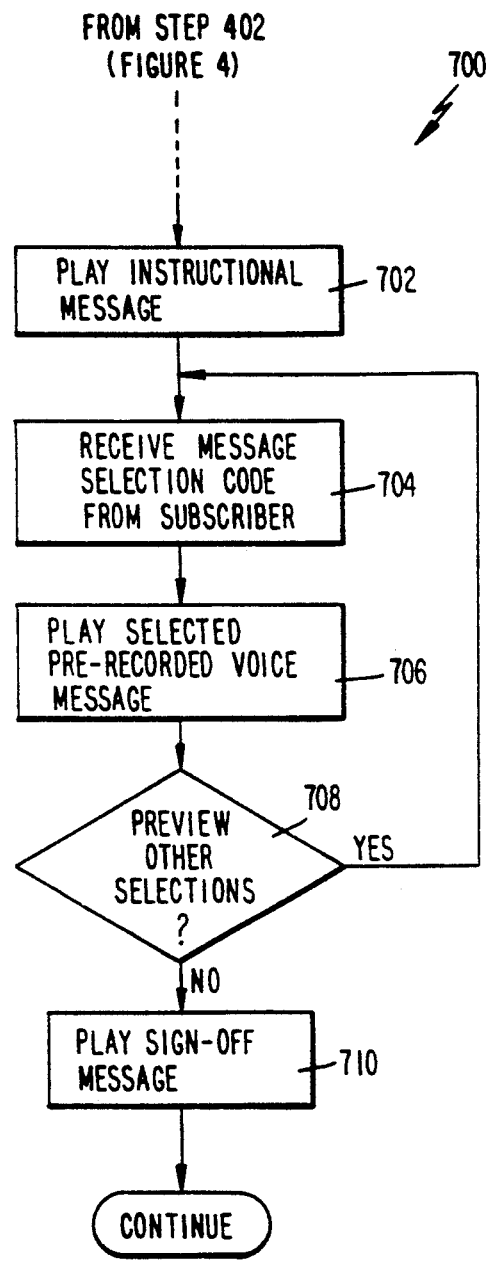
FIG. 7 is a flowchart of a routine for previewing prerecorded voice messages by the subscriber.

Referring next to FIG. 7, program routine 700, selected by step 508 in FIG. 5, enables the subscriber to preview prerecorded messages stored in the library 400 and available for selection. Following step 508, the subscriber enters a special code to enable him or her to preview prerecorded message selections. The preview option is described briefly to the subscriber (step 702), and upon receipt of the message selection code corresponding to a desired selection to be previewed by the subscriber (step 704), the selected prerecorded message is played out (step 706). The subscriber is then queried on whether he or she desires to preview other selections (step 708). If so, step 704, 706 and 708 are repeated. If no further selections are desired to be previewed, a sign-off message is played (step 710), and the program continues (step 404).

There has thus been described a unique method and system that combines attributes of greeting cards and voice message storage and retrieval, enabling a subscriber to store at a facility accessible by telephone or other terminal not only his/her personalized voice message but also another prerecorded message to be played out in succession to a designated recipient. By selecting from a library of celebrity or professional celebrity impersonator voices, humorous combinations of personalized and celebrity messages can be delivered to the recipient. As the recipient will obtain the access code from the subscriber by greeting card, there is no limitation on the range recipients to be designated, that is, the recipient does not have to be a member of or registered with the facility or within a specific geographic area. The personalized message may automatically be erased following play out, limiting each subscriber to one play per fee. Furthermore, each access code and its associated memory region, being effectively retired following play out of the associated messages, can be "recycled", making storage immediately available for new messages.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein. For example, whereas only one subscriber-selected prerecorded message is linked to one personalized message by the access code, in the preferred embodiment multiple messages of either type may be linked to play out a succession of personalized and selected voice messages to the recipient. As another example, whereas messages in the preferred embodiment are accessed only one time, under control by the flag bit of FIG. 8, the flag may be modified to enable any predefined number of accesses to be made.

What is claimed is:

1. A message telecommunication system for sending personalized voice messages from a central controller to a recipient at a voice entry terminal connected to a telecommunications network, comprising:

a mailing card having a field bearing an access code to be sent to the recipient;

the central controller including (a) a memory for storing a personalized voice message received from a subscriber over said telecommunications network, and (b) a prerecorded message data base storing a library of subscriber-selectable prerecorded messages in a plurality of different voices other than the voice of the subscriber;

a record medium, provided with said card, containing a listing of said prerecorded messages together with associated library selection codes;

the central controller further including (c) means for associating said access code with said personalized message received from said subscriber and a prerecorded message previously selected from said card listing by said subscriber and sent to the central controller over said telecommunications network, and (d) means, coupled to said telecommunications network and responsive to said access code read from the mailing card and transmitted to the central controller over said telecommunications network by said recipient, for sending successively said personalized and subscriber-preselected messages over said telecommunications network to said recipient.

2. The system of claim 1, wherein said card bears said access code in the form of printed alphanumeric characters.

3. The system of claim 1, wherein said card has another field bearing general informational text.

4. The system of claim 3, wherein said card has another field for bearing recipient address.

5. The system of claim 1, wherein said record medium is provided as a "tear off" portion of the card.

6. A message telecommunication system for sending personalized voice messages from a central controller to a recipient at a voice entry terminal connected to a telecommunications network, comprising:

a mailing card to be sent by a subscriber to the recipient, the card bearing an access code and having a tear-off portion to be removed before the card is sent;

the central controller including (a) a memory for storing a personalized voice message received from a subscriber over said telecommunications network, and (b) a prerecorded message data base storing a library of subscriber-selectable prerecorded messages in a plurality of different voices other than the voice of the subscriber;

the tear-off portion of said card bearing a listing of the prerecorded messages together with associated library selection codes;

the central controller further including (c) voice message reproducing apparatus for playing out voice messages stored in said memory and said data base, and (d) means programmed to assign said access code to said mailing card, and thereafter (i) associate said access code with said personalized message and a prerecorded message corresponding to a library selection code selected from said card listing and sent to said central controller by said subscriber; and (ii) in response to said access code read from said mailing card by said recipient and sent by said recipient to said central controller, play successively said personalized and subscriber-preselected messages to said recipient.

7. The system of claim 6, wherein said memory and said data base are accessible by said central controller.

8. The system of claim 6, wherein said remote terminal includes a data entry terminal and said access code is supplied by the recipient through said remote entry terminal.

9. A method of storing and retrieving personalized voice messages over a telecommunications network, comprising the steps of:

establishing a library of subscriber-selectable prerecorded messages in a plurality of different voices other than the voice of a subscriber;

issuing to the subscriber a record medium in the form of a mailing card bearing an access code to be mailed to a recipient and a record medium bearing a listing of said prerecorded messages and associated library selection codes;

storing a personalized voice message received from the subscriber over said telecommunications network;

associating said access code with said personalized message received from said subscriber and a prerecorded message selected by said subscriber from said listing of library selections;

sending the card by the subscriber to the recipient; and in response to said access code read from said mailing card and transmitted over said network by said recipient, successively playing said personalized and subscriber-preselected messages on said telecommunications network to said recipient.

10. The method of claim 9, including playing to said subscriber a greeting message instructing on how to record a personalized message and select a prerecorded message for subsequent playing out to the recipient.

11. The method of claim 9, including playing to said subscriber, subscriber-selected prerecorded messages from said library.

12. A method of storing and retrieving personalized voice messages over a telecommunications network interconnecting a central computer and subscriber and message recipient remote terminals, comprising the steps of:

at the central computer, establishing a library of subscriber-selectable prerecorded messages in voices other than the voice of the subscriber;

assigning an access code to a mailing card to be sent by the subscriber to a recipient, the card having a tear-off portion bearing a listing of such prerecorded messages and associated library selection codes to be removed before the card is sent; and at the central computer, receiving from the subscriber terminal said access code, a personalized voice message and a library selection code read by the subscriber from the tear-off portion of the card;

at the central computer, associating said access code with said personalized voice message and a selected prerecorded message;

removing the tear-off portion and sending the card from the subscriber to the recipient; and at the central computer, receiving said access code from the recipient terminal, the code having been read from the mailing card by the recipient, and in response, successively playing out said personalized and subscriber-selectable messages on said network to said recipient terminal.

13. The system of claim 1, including means for automatically erasing the personalized message from said memory upon reproduction of said personalized and subscriber-preselected messages by a reproducing means.

14. The system of claim 9, including the step of automatically erasing said personalized message upon playing out said personalized and subscriber-preselected messages.

15. The system of claim 9, wherein the record medium is provided as a tear-off portion of said mailing card, and is removed from said card before the card is mailed to the recipient.

* * * * *